(12) United States Patent
Schreter et al.

(10) Patent No.: US 10,241,907 B2
(45) Date of Patent: Mar. 26, 2019

(54) DBMS STORAGE MANAGEMENT FOR NON-VOLATILE MEMORY

(71) Applicant: SAP SE, Walldorf (DE)

(72) Inventors: Ivan Schreter, Malsch (DE); Daniel Booss, Wiesloch (DE); Akanksha Meghlan, Pune (IN); Mehul Wagle, Pune (IN)

(73) Assignee: SAP SE, Walldrof (DE)

( * ) Notice: Subject to any disclaimer, the term of this patent is extended or adjusted under 35 U.S.C. 154(b) by 23 days.

(21) Appl. No.: 15/598,609

(22) Filed: May 18, 2017

(65) Prior Publication Data
US 2018/0246676 A1  Aug. 30, 2018

(30) Foreign Application Priority Data

Feb. 28, 2017 (IN) .............................. 201741007010

(51) Int. Cl.
| | |
|---|---|
| *G06F 12/02* | (2006.01) |
| *G11C 11/56* | (2006.01) |
| *G06F 17/30* | (2006.01) |
| *G06F 3/06* | (2006.01) |
| *G06F 16/27* | (2019.01) |
| *G06F 16/11* | (2019.01) |
| *G06F 16/21* | (2019.01) |

(Continued)

(52) U.S. Cl.
CPC ........ *G06F 12/0238* (2013.01); *G06F 3/0604* (2013.01); *G06F 3/0646* (2013.01); *G06F 3/0649* (2013.01); *G06F 3/0679* (2013.01); *G06F 12/0246* (2013.01); *G06F 16/113* (2019.01); *G06F 16/211* (2019.01); *G06F 16/27* (2019.01); *G06F 16/901* (2019.01); *G11C 11/5628* (2013.01); *G06F 16/00* (2019.01); *G06F 2212/10* (2013.01); *G06F 2212/1016* (2013.01); *G06F 2212/1024* (2013.01); *G06F 2212/202* (2013.01)

(58) Field of Classification Search
None
See application file for complete search history.

(56) References Cited

PUBLICATIONS

Arulraj et al., Let's Talk About Storage & Recovery Methods for Non-Volatile Memory Database Systems, 2015, ACM, pp. 707-722 (16 total).*

(Continued)

*Primary Examiner* — Gary W. Cygiel
(74) *Attorney, Agent, or Firm* — Buckley, Maschoff & Talwalkar LLC

(57) ABSTRACT

A system includes reception of an instruction to create a data block associated with a portion of a database table in a non-volatile memory system, creation, in response to the instruction to create the data block, of a file associated with the data block in the non-volatile memory system, where a filename of the file comprises an indication that the data block is a temporary block, creation of an entry in a data block map table indicating that the data block is a temporary block, reception of an instruction to commit the data block, and, in response to the instruction to commit the data block, flush data associated with the data block to the file in the non-volatile memory system, rename the file to remove the indication that the data block is a temporary block, and update the entry in the data block map to indicate that the data block is a committed block.

18 Claims, 7 Drawing Sheets

(51) Int. Cl.
*G06F 16/901* (2019.01)
*G06F 16/00* (2019.01)

(56) References Cited

PUBLICATIONS

Microsoft, Description of how Word creates temporary files, retrieved on Aug. 2, 2018 from https://support.microsoft.com/en-us/help/211632/description-of-how-word-creates-temporary-files, 7 pages.*
Mustafa et al., Implications for Non-Volatile Memory as Primary Storage for Database Management Systems, 2016, IEEE, pp. 164-171 (8 total).*
Oukid, Ismail et al. "Instant Recovery for Main-Memory Databases", 7th Biennial Conference on Innovative Data System Research (CIDR'15), Jan. 4-7, 2015, Asilomar, California, USA, 9pgs.
Oukid, Ismail et al. "SOFORT: A Hybrid SCM-DRAM Storage Engine for Fast Data Recovery", DaMON'14, Jun. 22-27, 2014, Snowbird, UT, USA, ACM 978-1-4503-2971-2/14/06, http://dx.doi.org/10.1145/2619228.2619236, 7pgs.

* cited by examiner

US 10,241,907 B2

DBMS STORAGE MANAGEMENT FOR NON-VOLATILE MEMORY

CROSS-REFERENCE TO RELATED APPLICATIONS

This application is related to, and claims benefit of and priority to, Indian Provisional Patent Application No. 201741007010, filed Feb. 28, 2017, the contents of which are hereby incorporated by reference in their entirety for all purposes.

BACKGROUND

Non-Volatile Memory (NVM) provides an intermediate alternative between high-performance Dynamic Random Access Memory (DRAM) and cost-effective hard disk drives (HDDs). Generally, the read performance of NVM is similar to DRAM and the write performance of NVM is significantly faster than HDDs. It has been proposed to utilize NVM in database systems to provide at least some of the functionality which is currently provided by DRAM. NVM is byte-addressable and writes to NVM are durable, so database data stored therein may be accessed directly after a crash and restart. In contrast, restarting a conventional database would require reloading such database data from hard disk into DRAM.

Replacing DRAM with NVM in a database system poses challenges. For example, a persistent memory leak may result if a process/program dies due to an error occurring after a persistent memory allocation call. A system using DRAM can recover from all such leaks via an application or hardware restart, but such a restart would not necessarily address such leaks in the case of NVM. A consistent and durable NVM block manager is desired which provides block creation/deletion functionality, and efficient handling of block lifecycles across database savepoints and system crashes/restarts.

DETAILED DESCRIPTION

According to some embodiments, an NVM block management system is provided to enable a database system to efficiently exploit a persistent memory space by providing allocation, deallocation, data durability, persistent memory leak handling, data recovery after a restart, etc. This system may reside between the operating system (OS)/hardware and the user application, and uses a directory on a mounted filesystem where NVM blocks are stored as files and mapped into memory.

Figure 1:
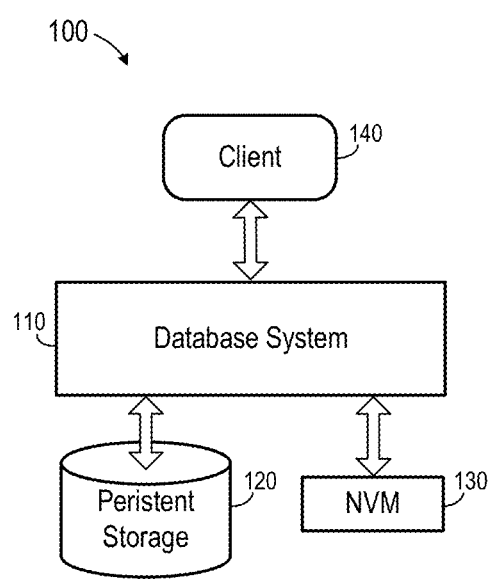
FIG. 1 is a block diagram of a system according to some embodiments.

FIG. 1 is a block diagram of system 100 according to some embodiments. System 100 includes database system 110, persistent storage 120, NVM 130, and client 140. According to some embodiments, database system 110, persistent storage 120 and NVM 130 may operate to serve transactional and analytical data to client 140 based on requests received therefrom.

Database system 110 may comprise any query-responsive database system that is or becomes known, including but not limited to a structured-query language (i.e., SQL) relational database management system. Database system 110 generally provides data to reporting clients, such as client 120, in response to instructions (e.g., SQL statements) received therefrom. In some embodiments, database system 110 receives an instruction from client 120. Database system 110 generates a statement execution plan based on the instruction and on stored metadata describing the data of the database. The statement execution plan is forwarded to storage layer of database system 110, which executes the plan and returns a corresponding dataset. Database system 110 then returns the dataset to client 120. Embodiments are not limited thereto.

Database system 110 may comprise an "in-memory" database, in which Random Access Memory is used for cache memory and for storing the full database during operation. According to some embodiments, Dynamic Random Access memory (i.e., DRAM) may be used to store portions of the full database while NVM 130 is used to store other portions of the full database. As mentioned above, the portions stored by NVM 130 are persisted and therefore need not be reloaded after a database crash.

In some embodiments, the data of database system 110 may comprise one or more of conventional tabular data, row-based data stored in row format, column-based data stored in columnar format, and object-based data. Moreover, the data of database system 110 may be indexed and/or selectively replicated in an index to allow fast searching and retrieval thereof. Some embodiments of an NVM block manager may be used regardless of storage architecture (e.g., row-based or column-based).

Persistent storage 120 may comprise one or more non-volatile data storage units (e.g., fixed disks) storing a relational database, a multi-dimensional database, an eXtendable Markup Language (i.e., XML) document, or any other structured and/or unstructured data. Persistent storage 120 may also store log volumes, data backups, and/or other suitable data. The data of persistent storage 120 may be distributed among several non-volatile data storage units. Embodiments are not limited to any number or types of non-volatile data storage units.

NVM 130 may be implemented using flash-based memory connected to a processor vie PCIe interconnect technology, but other variants are known, including but not limited to 3D XPoint, Phase-change Random Access Memory, Magnetic Random Access Memory, and Memristors. NVM 130 may exhibit a Dual In-Line Memory Module (i.e., DIMM) form-factor and may therefore interface with a Central Processing Unit (i.e., CPU) of database system 110 as RAM (e.g., byte-addressable, directly accessible using load/store instructions, and covered by CPU cache-line handling, including cross-socket cache coherency) rather than as a block device. According to some implementations, the device latency of NVM 130 is close to that of DRAM and its bandwidth lower than that of DRAM.

Client 120 may comprise one or more devices executing program code of a software application for presenting user interfaces to allow interaction with data server 130. Presentation of a user interface may comprise any degree or type of rendering, depending on the type of user interface code generated by database system 110. For example, client 120 may execute a Web Browser to receive a Web page (e.g., in HTML format) from database system 110, and may render and present the Web page according to known protocols. Client 120 may also or alternatively present user interfaces by executing a standalone executable file (e.g., an .exe file) or code (e.g., a JAVA applet) within a virtual machine.

Although embodiments are described with respect to system 110, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 110 may also or alternatively support multi-tenancy by providing multiple logical database systems which are programmatically isolated from one another.

Figure 2:
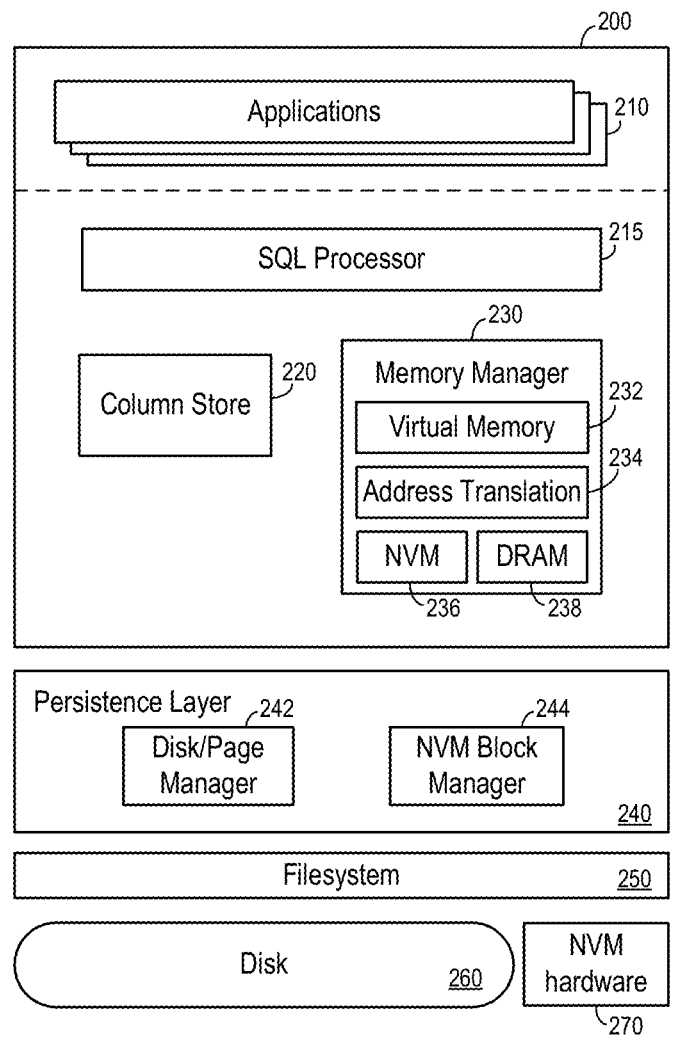
FIG. 2 is a block diagram of a database architecture according to some embodiments.

FIG. 2 is a block diagram of an implementation of database system 110, persistent storage 120 and NVM 130 of FIG. 1. Embodiments are not limited to the illustrated elements of FIG. 2. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable software code.

System 200 includes SQL processor 215, which receives SQL statements from one or more client systems as is known in the art (not shown). The SQL statements may include Data Description Language statements (DDLs), queries, and Data Manipulation Language statements. Handling of received queries may require the retrieval of data from column store 220. Column store 220 stores tabular data of a database as is known in the art. DDLs may be handled by creating, deleting or altering a column of column store 220. According to some embodiments, new columns are constructed by column store 220 and persisted to NVM if appropriate.

Column store 220 uses memory manager 230 to retrieve data from NVM 236 and DRAM 238. According to some embodiments, NVM 236 is used to store column dictionaries and column vector backing arrays. Each column (or column fragment, representing a partitioned portion of a column) is associated with an NVM block containing its data. In some embodiments, smaller intermediate data structures (e.g., row counts of most-common values, access and usage statistics, bit vector of null values) of columns are allocated in DRAM 238. All delta and MVCC data structures may be allocated in DRAM 238, as are intermediate results of query processing.

For columns associated with an NVM block, column store 220 constructs an NVM block key and uses the key to request a pointer from memory manager 230. Memory manager 230 maps the NVM block into an address of virtual memory 232 via address translation 234. This address is passed back to column store 220, which then points the index vector and dictionary of the in-memory representation of the main column fragment directly into the NVM block.

Memory allocations (including those of the NVM blocks) are mapped to different addresses of virtual memory 232 via address translation 234. NVM blocks are not mapped into virtual memory 232 on restart. As described below, NVM blocks are instead mapped on a first read/write request over them issued by an application.

Persistence layer 240 include disk/page manager 242 to control disk-based filesystem 250 for writing to and reading from data volumes and log volumes stored on disk 260. Similarly, persistence layer 240 includes NVM block manager 244 to control an NVM-based filesystem to manage NVM blocks of NVM hardware 270 used to store columnar data. NVM 236 and NVM hardware 270 represent the same physical hardware and the separate depiction in FIG. 2 is to illustrate a conceptual relationship. Specifically, the relation is that NVM "files" 236 are mapped into the virtual memory 232 when the NVM blocks are loaded, and the contents of the NVM files are stored in NVM 270.

According to some embodiments, NVM block manager 244 facilitates consistent persistent memory management so that the upper database layers can efficiently exploit the persistent NVM space without having to consider allocation, deallocation, data durability, persistent memory leaks, and recovery of data after a restart. NVM block manager 244 is based upon memory-mapped files, thereby leveraging the load/store capabilities of persistent memory while also compatible with other storage technologies (e.g., Solid State Disks).

In some embodiments, the implementation model of NVM block manager 244 is based on a root directory of the mounted filesystems. The root directory may be the location at which the persistent memory devices (i.e., DIMMs) are mounted. The physical location may be DAX-enabled, which is a Linux feature added for persistent memory storage. If supported, the DAX bypasses the kernel page cache which is usually used to buffer reads/writes into files.

For file-based mappings, the persistent memory space is mapped directly into virtual memory 232. All the NVM-resident blocks are stored under a root directory as will be described in detail below and, at startup, these blocks are loaded from the root directory as described below. The NVM physical block lifecycle management is aligned with the savepoint logic of the database and is similarly initiated by a savepoint/restart/crash. As will be described below, NVM block manager 244 keeps track of the savepoint version of the system at the time of creation of a new NVM block and uses the information to handle blocks during associated events (e.g., savepoint/restart/crash), which simplifies the corresponding handling of these events by the upper layers.

According to some embodiments, NVM block manager 244 maintains three types of blocks, a data block, a tombstone block and a temporary block. A data block stores the actual data of relational tables. A data block is an NVM-committed and persisted block, and is marked as "read-only". A tombstone block is created when a request is received to delete a data block that belongs to an earlier checkpoint version. The tombstone block persists information indicating that a data block is marked for deletion, so that the to-be-deleted data block can be handled if the system crashes before the data block is actually deleted.

A temporary block is a data block that is not yet committed. For example, a temporary block is a data block that was created but was not written and flushed (NVM-committed) to the persistent memory space due to an intervening system crash. As will be described below, the identification of a block as a temporary block is persisted in the block's filename so that the block can be differentiated from valid data blocks even after a crash. Temporary blocks are generally pruned at restart.

Figure 3:
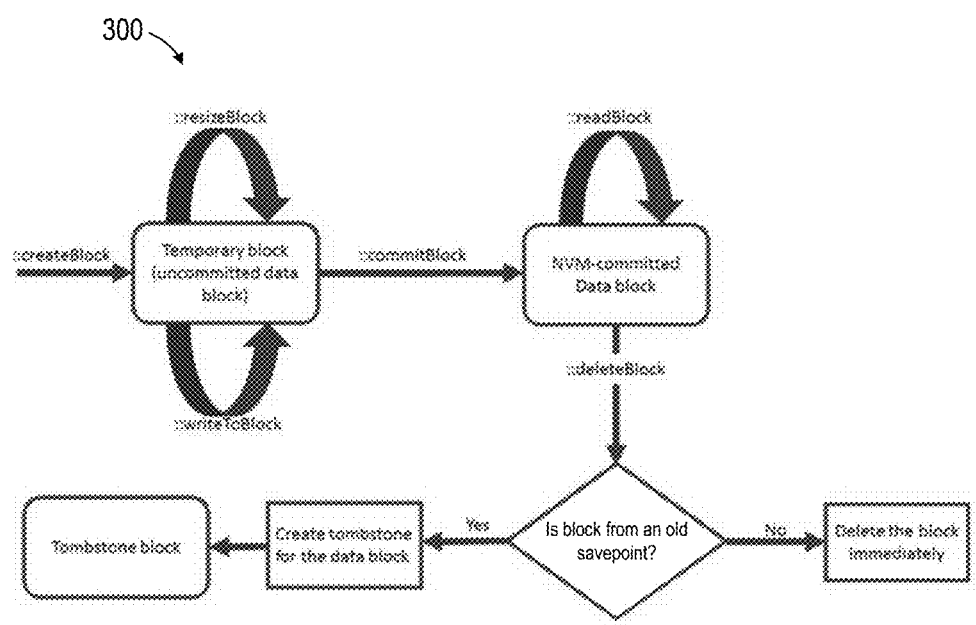
FIG. 3 illustrates state relationships between block types according to some embodiments.

FIG. 3 depicts the relationship between the three types of blocks within the lifecycle of an NVM block. As shown, NVM block manager 244 creates a temporary block in response to an instruction to create a data block. The temporary block may be resized and/or written. Upon commit, NVM block manager 244 "converts" the temporary block to a data block, as will be described. The data block is NVM-committed and may be read from.

After receiving an instruction to delete a data block, NVM block manager 244 determines whether the block was created during the current savepoint version or a previous savepoint version. The block is deleted if it was created during the current savepoint version. If not, a tombstone block associated with the data block is created. Usage of the tombstone block to clean up the to-be-deleted data block will be described below.

Figure 4:
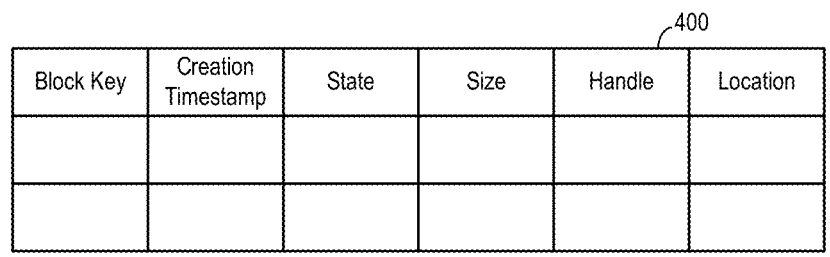
FIG. 4 is a tabular representation of a portion of a data block map according to some embodiments.

NVM block manager 244 maintains three data structures in DRAM to facilitate efficient access and cleanup of the blocks, a data block map, a tombstone map and a temporary block map. FIG. 4 is a tabular representation of a portion of data block map 400 according to some embodiments. According to some embodiments, data block map 400 is a sorted multi-map of the data blocks to ensure easy access to the blocks. An entry is added in response to each successful creation of a data block. The entry maintains key information regarding the data block such as its block key, creation timestamp (e.g., the savepoint version at the time of creation), state (e.g., NVM-committed or marked for deletion), size, handle to its virtual address mapping, location, etc.

Figure 5:
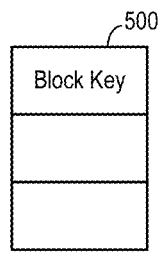
FIG. 5 is a tabular representation of a portion of a tombstone block map according to some embodiments.

FIG. 5 illustrates a tabular representation of a portion of tombstone map 500 according to some embodiments. A savepoint ensures that the system's state is consistent until the timestamp of the savepoint. If a data block belonging to an earlier savepoint version is requested for deletion, NVM block manager 244 creates an entry identifying the data block in tombstone map 500. As will be described below, the identified data blocks are cleaned up during the next savepoint. Map 500 facilitates efficient lookups of data blocks to be cleaned up. If the system crashes before this cleanup, map 500 is re-created on startup using tombstone blocks which were created to persist the information of map 500.

Figure 6:
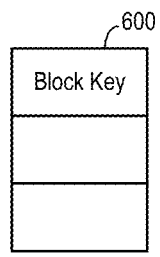
FIG. 6 is a tabular representation of a portion of a temporary block map according to some embodiments.

Temporary block map 600 of FIG. 6 includes a list of uncommitted and unhandled blocks. The list is created on every restart and all blocks in the list are cleaned up as will be described below.

Figure 7:
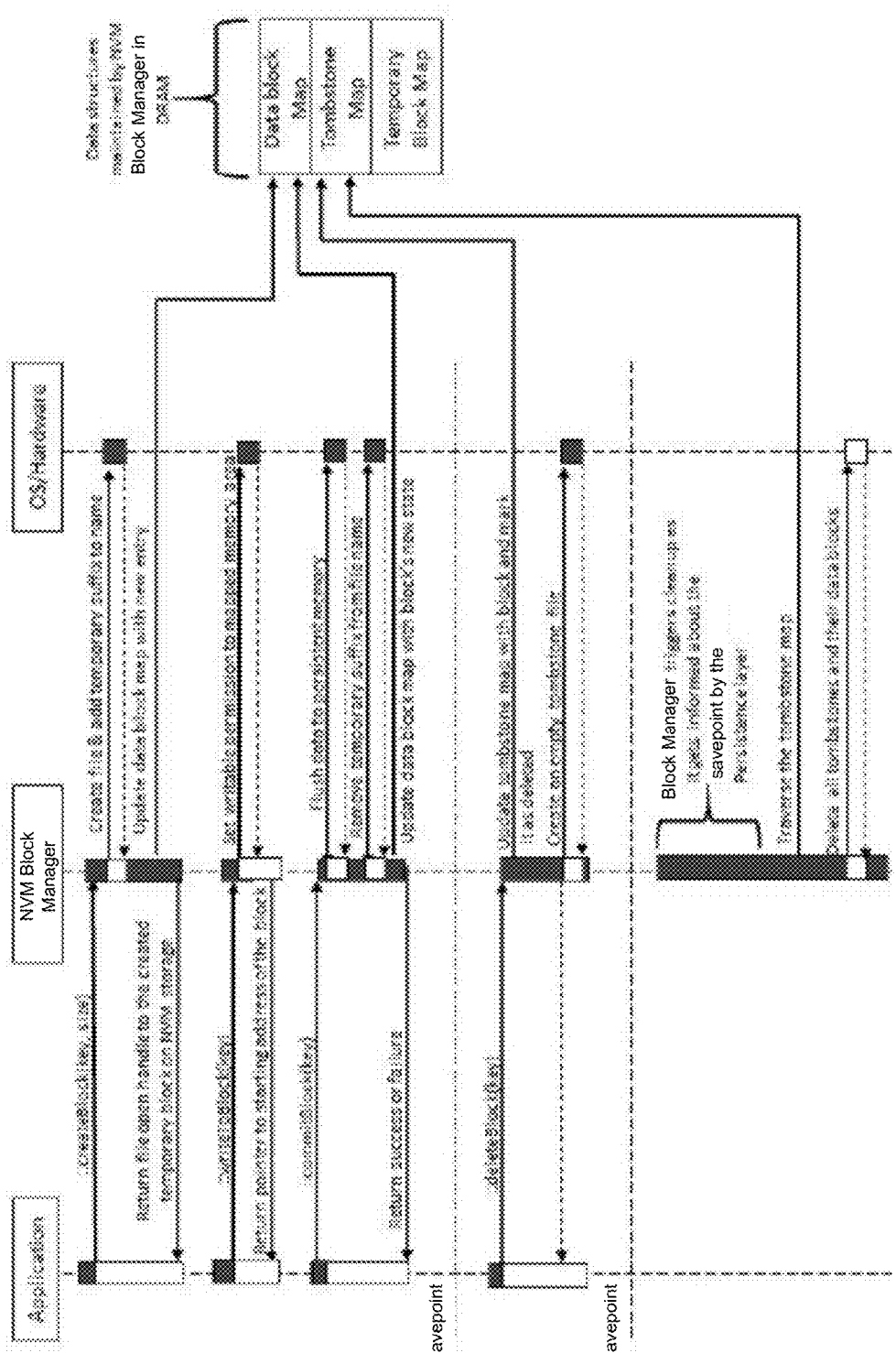
FIG. 7 comprises a sequence diagram of a process to manage a block lifecycle according to some embodiments.

FIG. 7 comprises a sequence diagram of process 700 to manage a block lifecycle according to some embodiments. In some embodiments, various hardware elements execute program code to perform process 700. Process 700 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

As mentioned above, all the NVM-resident blocks are stored under a root directory, and these blocks are loaded from the root directory at startup. The filenames of the blocks and their location under the root directory play a role in maintaining these blocks based upon their type and the current checkpoint version, as will become evident in the foregoing description.

In some embodiments, on startup due to normal restart or crash, NVM block manager 244 receives an identifier of the root directory from the database administrator, for example as part of the database configuration files. A data directory and a tombstone directory are constructed based on this information (e.g., Data directory: <root_directory>/NVM-Root/<VolId>/data; and Tombstone directory: <root_directory>/NVM-Root/<VolId>/tombstones, where "root_directory" is the base location provided by the database administrator and "VolId" is a volume id provided by persistence layer 240. The "Data" directory stores all NVM data blocks and the "Tombstone" directory stores all information related to deletion requests on these data blocks.

As illustrated in process 700, NVM block manager 244 may receive a request to create a block, specifying a block key and size. In response, NVM block manager 244 creates a file of that size under the "data" directory with the structure <root_directory>/NVM-Root/<VolId>/data/<key>/<SVPversion>.fileblockT, where "key" is the received block key and "SVPversion" is the current savepoint version of the system.

Therefore, upon receiving a request to create an NVM block, NVM block manager 244 creates it as a temporary block by appending the suffix "T" to the filename. The block key is a numeric identifier used to uniquely identify an NVM block associated with a column (or column fragment) according to some embodiments. An NVM block key may be constructed as follows: NVM block key::=ContainerID '-' FragmentID '-' ColumnID '-' NVMBlockID, where ColumnID is the numeric identifier for the column, FragmentID is the numeric identifier for the table fragment containing the column fragment, and ContainerID is the numeric identifier for the table partition containing the table fragment.

After successful creation of the file, NVM block manager 244 updates the data block map with a new entry associated with the newly-created temporary block. The new entry may include the block key, savepoint version (SVPversion), state (uncommitted), size, handle to its virtual address mapping, and directory location. NVM block manager 244 also returns a handle to the block to the client application. As further illustrated in process 700, the client application may issue write request, in response to which NVM block manager 244 sets writable permission to the corresponding mapped memory area and returns a pointer to the starting address of the block.

As mentioned above with respect to FIG. 3, the client application may issue a request to commit the block. In response, and as depicted in FIG. 7, NVM block manager 244 flushes the data to the NVM, removes the suffix "T" from the filename, and updates the corresponding entry in the data block map to indicate the "committed" state of the block. If the system crashes before the commit request is fulfilled, the suffix will assist NVM block manager 244 during the next restart to distinguish and clean all such temporary blocks.

It will now be assumed that a request to delete the committed data block is received during a next savepoint version, as shown in FIG. 7. NVM block manager 244 updates the tombstone map with an entry identifying the data block, thereby indicating that the data block is marked for deletion. Such deletion may occur after a next savepoint based on this entry.

NVM block manager 244 also creates a tombstone block under the Tombstone directory to persist information indicating that the data block is marked for deletion. This persisted information allows the NVM block manager 244 to handle the data block even if the system crashes before it is deleted. A tombstone block may comprise a zero-sized (i.e., empty) file. The directory path of the created tombstone block may be as follows: <root_directory>/NVM-Root/<VolId>/tombstones/<key>/<SVPversion'>.fileblock, where "SVPversion'" corresponds to the savepoint version during which the data block having key="key" was requested for deletion.

It will now be assumed that a next savepoint occurs as shown in FIG. 7. NVM block manager 244 is informed of the savepoint by persistence layer 240 and, as a result, triggers a cleanup operation. The cleanup operation consists of traversing the tombstone map to identify the current tombstone blocks. For each identified tombstone block, NVM block manager 244 deletes the tombstone block and the data block represented by the tombstone block.

Figure 8:
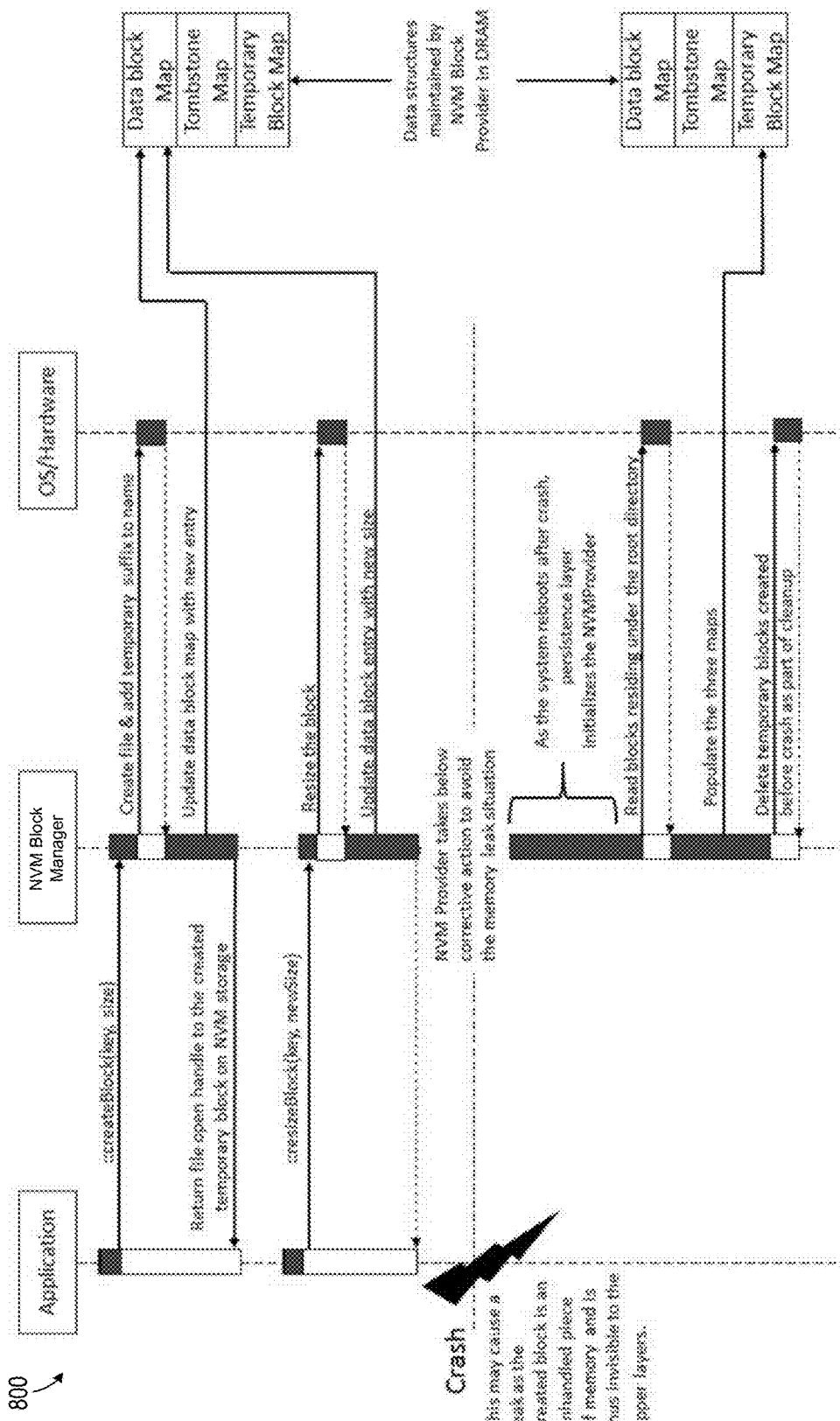
FIG. 8 comprises a sequence diagram of a process to address persistent memory leaks according to some embodiments.

FIG. 8 illustrates a sequence to illustrate crash recovery according to some embodiments. A block is initially created in a temporary and uncommitted state as described above. The client application issues an instruction to resize the block, in response to which NVM block manager 244 requests resizing of the block and updates the corresponding entry of the data block map with the new size. It is then assumed that a crash occurs. At this point, the NVM block has been allocated in NVM but has not yet been populated or NVM-committed.

In response to the crash, and to avoid a memory leak, NVM block manager 244 then traverses the root directory for persistent memory (NVM) blocks, and categorizes each located block as a temporary block (e.g., if it is in the Data directory and its filename ends with "T"), a data block (if it is in the Data directory and its filename does not end with "T"), or as a tombstone block (e.g., if it is in the Tombstone directory). Based on each of the identified blocks, NVM block manager 244 populates the data block map, the tombstone map, and the temporary block map.

The database is restored to a valid and consistent savepoint, and all temporary blocks are deleted to assist in avoiding persistent memory leaks. Additionally, all data blocks created at a savepoint version which is later than the current savepoint version are deleted, all tombstone blocks created at a later savepoint version are deleted and the corresponding data blocks are again marked as valid and committed in the data block map. All tombstone blocks created at an earlier savepoint version are also deleted along with their corresponding data blocks.

Embodiments therefore may incorporate inventive techniques to persist blocks' state information and savepoint versions using directory paths, and to utilize this persisted information during recovery to retain/destroy blocks and to handle persistent memory leaks.

Some embodiments ensure synchronization of data and metadata after operations over a NVM block such as create, flush, modify, resize, etc. Users may create arbitrary-sized persistent memory blocks with resizable characteristics in some embodiments. A block management algorithm according to some embodiments efficiently handles a block's physical state across savepoints and system restarts/crashes. This also involves delaying the physical destruction logic to the next savepoint/restart in order to provide the client application with a correct and consistent state of the underlying block storage.

Pre-allocation of files during creation/resize operations may avoid inconsistent NVM state according to some embodiments.

According to some embodiments, mapping of an NVM block in memory is delayed until its first read/write access request, instead of at load/creation time. NVM typically provides vast amounts of memory space, often resulting in many variable-sized blocks being stored in NVM at any instant. Delaying the mapping may conserve resources because not all stored block will necessarily be eventually accessed.

Some embodiments maintain statistical information such as count of successfully created blocks, deleted blocks, loaded blocks, pruned blocks, etc. along with total size of each metric in bytes.

Figure 9:
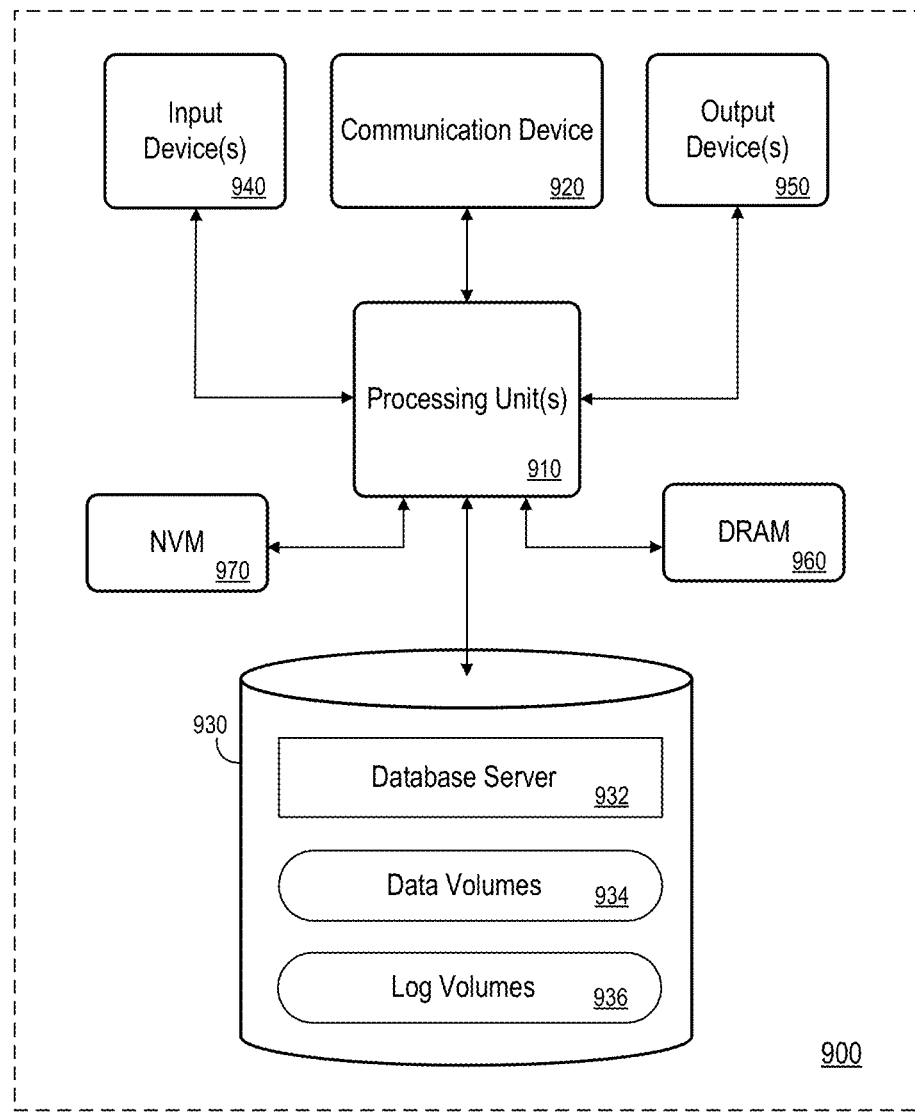
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of system 200 of FIG. 2 and/or of database system 110, persistent storage 120 and NVM 130 of FIG. 1 in some embodiments. Apparatus 900 may include other unshown elements according to some embodiments.

Apparatus 900 includes processing unit(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc. Data storage device 930 may be implemented using one or more arrays of storage devices, one or more of which may be remote from one another.

Database server 932 may comprise program code executed by processing unit(s) 910 to cause apparatus 900 to perform any one or more of the processes described herein. Embodiments are not limited to execution of these processes by a single apparatus. Data volumes 934 may include conventional database data and metadata as described above, while log volumes 936 may comprise log data as is known in the art.

Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a first non-volatile memory system storing processor-executable process steps;
   a second non-volatile memory system; and
   a processor to execute the processor-executable process steps to cause the system to:
   receive an instruction to create a data block associated with a portion of a database table in the second non-volatile memory system;
   in response to the instruction to create the data block, create a file associated with the data block in the second non-volatile memory system, where a filename of the file comprises an indication that the data block is a temporary block;
   create an entry in a data block map table indicating that the data block is a temporary block;
   receive an instruction to commit the data block;
   in response to the instruction to commit the data block, flush data associated with the data block to the file in the second non-volatile memory system, rename the file to remove the indication that the data block is a temporary block, and update the entry in the data block map to indicate that the data block is a committed block;
   receive an instruction to delete the data block; and
   in response to the instruction to delete the data block, create an entry in a tombstone block map comprising an identifier of the data block, and create a tombstone file, where a directory path of the tombstone file indicates the data block and a current savepoint version.

2. The system according to claim 1, the processor to execute the processor-executable process steps to cause the system to:
   detect execution of a next savepoint;
   in response to the detected execution, identify the entry in the tombstone block map; and
   in response to identification of the entry, delete the file associated with the data block and the tombstone file.

3. The system according to claim 1, wherein a directory path of the file associated with the data block comprises the current savepoint version and a block key identifying the data block.

4. The system according to claim 3, wherein the entry in the data block map table comprises the block key, the current savepoint version, the size of the data block, a handle to a virtual address mapping of the data block, and the directory path of the file associated with the data block.

5. The system according to claim 1, the processor to execute the processor-executable process steps to cause the system to:
   receive an instruction to delete the data block;
   in response to the instruction to delete the data block, create an entry in a tombstone block map comprising an identifier of the data block, and create a tombstone file, where a directory path of the tombstone file indicates the data block and a current savepoint version,
   wherein a directory path of the file associated with the data block and the directory path of the tombstone file share a root directory, and
   wherein, during a restart of the system, the processor is to execute the processor-executable process steps to cause the system to:
   identify a plurality of blocks in the root directory for blocks, and categorize each of the plurality of blocks as a temporary block, a data block, or as a tombstone block based on its directory path and filename.

6. The system according to claim 1, wherein the data block is not mapped to a volatile memory until an instruction to read the data block or an instruction to write to the data block is received.

7. A computer-implemented method, comprising:
   receiving an instruction to create a data block associated with a portion of a database table in a non-volatile memory system;
   in response to the instruction to create the data block, creating a file associated with the data block in the non-volatile memory system;
   receiving an instruction to commit the data block;
   in response to the instruction to commit the data block, flushing data associated with the data block to the file in the non-volatile memory system, renaming the file to remove the indication that the data block is a temporary block, and updating the entry in the data block map to indicate that the data block is a committed block;
   receiving an instruction to delete the data block; and
   in response to the instruction to delete the data block, creating an entry in a tombstone block map comprising an identifier of the data block, and create a tombstone file, where a directory path of the tombstone file indicates the data block and a current savepoint version.

8. The method according to claim 7, further comprising:
   where a filename of the file comprises an indication that the data block is a temporary block; and
   creating an entry in a data block map table indicating that the data block is a temporary block.

9. The method according to claim 8, further comprising:
detecting execution of a next savepoint;
in response to the detected execution, identifying the entry in the tombstone block map; and
in response to identification of the entry, deleting the file associated with the data block and the tombstone file.

10. The method according to claim 7, wherein a directory path of the file associated with the data block comprises the current savepoint version and a block key identifying the data block.

11. The method according to claim 10, wherein the entry in the data block map table comprises the block key, the current savepoint version, the size of the data block, a handle to a virtual address mapping of the data block, and the directory path of the file associated with the data block.

12. The method according to claim 7, further comprising:
receiving an instruction to delete the data block;
in response to the instruction to delete the data block, creating an entry in a tombstone block map comprising an identifier of the data block, and creating a tombstone file, where a directory path of the tombstone file indicates the data block and a current savepoint version,
wherein a directory path of the file associated with the data block and the directory path of the tombstone file share a root directory, and
further comprising, during a restart of the system:
identifying a plurality of blocks in the root directory for blocks, and categorizing each of the plurality of blocks as a temporary block, a data block, or as a tombstone block based on its directory path and filename.

13. The method according to claim 7, wherein the data block is not mapped to a volatile memory until an instruction to read the data block or an instruction to write to the data block is received.

14. A non-transitory computer-readable medium storing program code, the program code executable by a computer system to cause to the computer system to:
receive an instruction to create a data block associated with a portion of a database table in a non-volatile memory system;
in response to the instruction to create the data block, create a file associated with the data block in the non-volatile memory system, where a filename of the file comprises an indication that the data block is a temporary block;
create an entry in a data block map table indicating that the data block is a temporary block;
receive an instruction to commit the data block;
in response to the instruction to commit the data block, flush data associated with the data block to the file in the non-volatile memory system, rename the file to remove the indication that the data block is a temporary block, and update the entry in the data block map to indicate that the data block is a committed block;
receive an instruction to delete the data block; and
in response to the instruction to delete the data block, create an entry in a tombstone block map comprising an identifier of the data block, and create a tombstone file, where a directory path of the tombstone file indicates the data block and a current savepoint version.

15. The medium according to claim 14, the program code executable by a computer system to cause to the computer system to:
detect execution of a next savepoint;
in response to the detected execution, identify the entry in the tombstone block map; and
in response to identification of the entry, delete the file associated with the data block and the tombstone file.

16. The medium according to claim 14, wherein a directory path of the file associated with the data block comprises the current savepoint version and a block key identifying the data block.

17. The medium according to claim 14, the program code executable by a computer system to cause to the computer system to:
receive an instruction to delete the data block;
in response to the instruction to delete the data block, create an entry in a tombstone block map comprising an identifier of the data block, and create a tombstone file, where a directory path of the tombstone file indicates the data block and a current savepoint version,
wherein a directory path of the file associated with the data block and the directory path of the tombstone file share a root directory, and
wherein, during a restart of the system, the program code is further executable by the computer system to cause to the computer system to:
identify a plurality of blocks in the root directory for blocks, and categorize each of the plurality of blocks as a temporary block, a data block, or as a tombstone block based on its directory path and filename.

18. The medium according to claim 14, wherein the data block is not mapped to a volatile memory until an instruction to read the data block or an instruction to write to the data block is received.

* * * * *